United States Patent [19]
Yoshimori

[11] Patent Number: 6,138,362
[45] Date of Patent: Oct. 31, 2000

[54] CABLE STRIPPER

[75] Inventor: Naoki Yoshimori, Taito-ku, Japan

[73] Assignee: Canare Electric Co., Ltd., Aichi, Japan

[21] Appl. No.: 09/056,533

[22] Filed: Apr. 8, 1998

[30] Foreign Application Priority Data

Apr. 28, 1997 [JP] Japan ................................ 9-111462

[51] Int. Cl.[7] .................................................. H02G 1/12
[52] U.S. Cl. ............................ 30/90.1; 30/91.2; 81/9.44
[58] Field of Search .................... 30/90.1, 90.2,
30/90.3, 90.4, 90.6, 90.7, 90.8, 91.1, 91.2,
92, 93, 101, 102; 81/9.51, 9.4, 9.44

[56] References Cited

U.S. PATENT DOCUMENTS

| | | | |
|---|---|---|---|
| 4,117,749 | 10/1978 | Economu | 30/90.6 |
| 4,730,391 | 3/1988 | Wood | 30/90.1 |
| 4,829,671 | 5/1989 | Cheng | 30/90.1 |
| 4,945,636 | 8/1990 | Takizawa | 30/90.1 X |
| 4,979,299 | 12/1990 | Bieganski | 30/90.1 |
| 5,182,859 | 2/1993 | Yoshimori | 30/90.6 |
| 5,265,339 | 11/1993 | Nilsson | 30/90.1 X |
| 5,381,601 | 1/1995 | Danter et al. | 30/90.1 |
| 5,398,413 | 3/1995 | Chen | 30/91.2 X |

FOREIGN PATENT DOCUMENTS

| | | | |
|---|---|---|---|
| S61-293107 | 12/1986 | Japan . | |
| S62-173908 | 7/1987 | Japan . | |
| 5-49135 | 2/1993 | Japan | 81/9.51 |

Primary Examiner—Clark F. Dexter
Attorney, Agent, or Firm—Koda & Androlia

[57] ABSTRACT

A cable stripper for removing covers or jackets of, for instance, a coaxial cable including circular blades rotatably installed on action levers which are pivoted together with an operating lever that is pivotally mounted to a stripper main body, and a lower blade linked to a lower cutter lever provided in the stripper main body. The circular blades bite into the cover of a cable inserted into the stripper main body when the operating lever is pivoted toward the stripper main body, thus making circumferential cuts of different depths in the cover by rotating the stripper main body about the axis of the cable; and in addition, when the lower cutter lever is pressed, the lower blade bites into the covering so that a straight cut in the axial direction of the cable is also made in the covering.

4 Claims, 6 Drawing Sheets

CABLE STRIPPER

BACKGROUND OF THE INVENTION

1. Field of the Invention

The present invention relates to a cable stripper and more particularly to a device for removing the covering and insulating portion of an electrical cable.

2. Prior Art

Japanese Patent Application Pre-Examination Publication (Kokai) No. S62-173908 discloses one type of cable stripper that removes the covering of a coaxial cable.

This cable stripper comprises an elongated hollow main body that includes therein a pair of lever-form pivoting elements, a positioning tube mounted on this hollow main body in a rotatable fashion, and a circular cutter cassette installed inside the cover of the hollow main body. A cable is set in a prescribed position by the positioning tube and then positionally held by a toggle lever so as not to be moved. With both side portions of the hollow main body brought into a closed position, circumferential cuts are formed in the end portion of the cable by a relative rotation of the hollow main body and the end portion of the cable about the longitudinal axis of the cable.

However, this conventional cable stripper can only be used for a cable that has a particular diameter; therefore, in cases where cables of other diameters are to be cut, a different cable stripper that fits the cable to be cut must be used. Furthermore, the positioning of the cable in the prescribed position by the toggle lever requires time and effort; thus, the working characteristics of such cable strippers tend to be poor.

SUMMARY OF THE INVENTION

Accordingly, the object of the present invention is to provide a cable stripper which can form circumferential cuts in the covering of a cable, a coaxial cable for instance, by a simple operation and which can perform a stepped-form cutting in the end portions of a number of cables of different diameters.

The object is accomplished by a unique structure for a cable stripper which includes: an elongated stripper main body of a box shape, an operating lever pivotally provided at one end of the stripper main body, a cable guide rotatably coupled to the exterior surface of one end of the stripper main body so as to guide a cable into the main body and hold the cable in position, a plurality of action levers pivotally installed inside one end of the stripper main body in a coaxial fashion with the operating lever, a plurality of circular blades removably mounted to the action levers, and a limiting device rotatably installed inside of another end of the stripper main body so as to determine the depth of cutting into the cable introduced into the stripper main body.

In the structure above, each of the circular blades is mounted on each of the action levers so as to be oriented in a direction perpendicular to the axis of the cable introduced into the stripper main body. In addition, the limiting device includes a stopper which restricts the movement of the circular blades when the action levers are pivoted so that the circular blades can move only a prescribed amount, a rotatable cam body attached to a cam shaft installed in the stripper main body, and an operating knob which has an engaging mechanism that engages with and disengages from the stripper main body. The rotatable cam body has a polygonal shape that has a plurality of projected portions, and adjustment screws which limit the actions of the action levers are installed on the respective projected portions.

Thus, in the cable stripper of the present invention, a plurality of circular blade assemblies that form circumferential cuts in the coverings of the cable are mounted in the action levers, and the cable stripper is operated by the action levers which have these circular blade assemblies. Accordingly, when the operating lever is operated with the end of the cable introduced into the stripper main body, circumferential cuts are easily made in the covering portions of the end of the cable with the cutting center coinciding with the axis of the cable; and in addition, the cable stripper can be used on a number of different types of cables having different diameters.

DETAILED DESCRIPTION OF THE PREFERRED EMBODIMENTS

Figure 1:
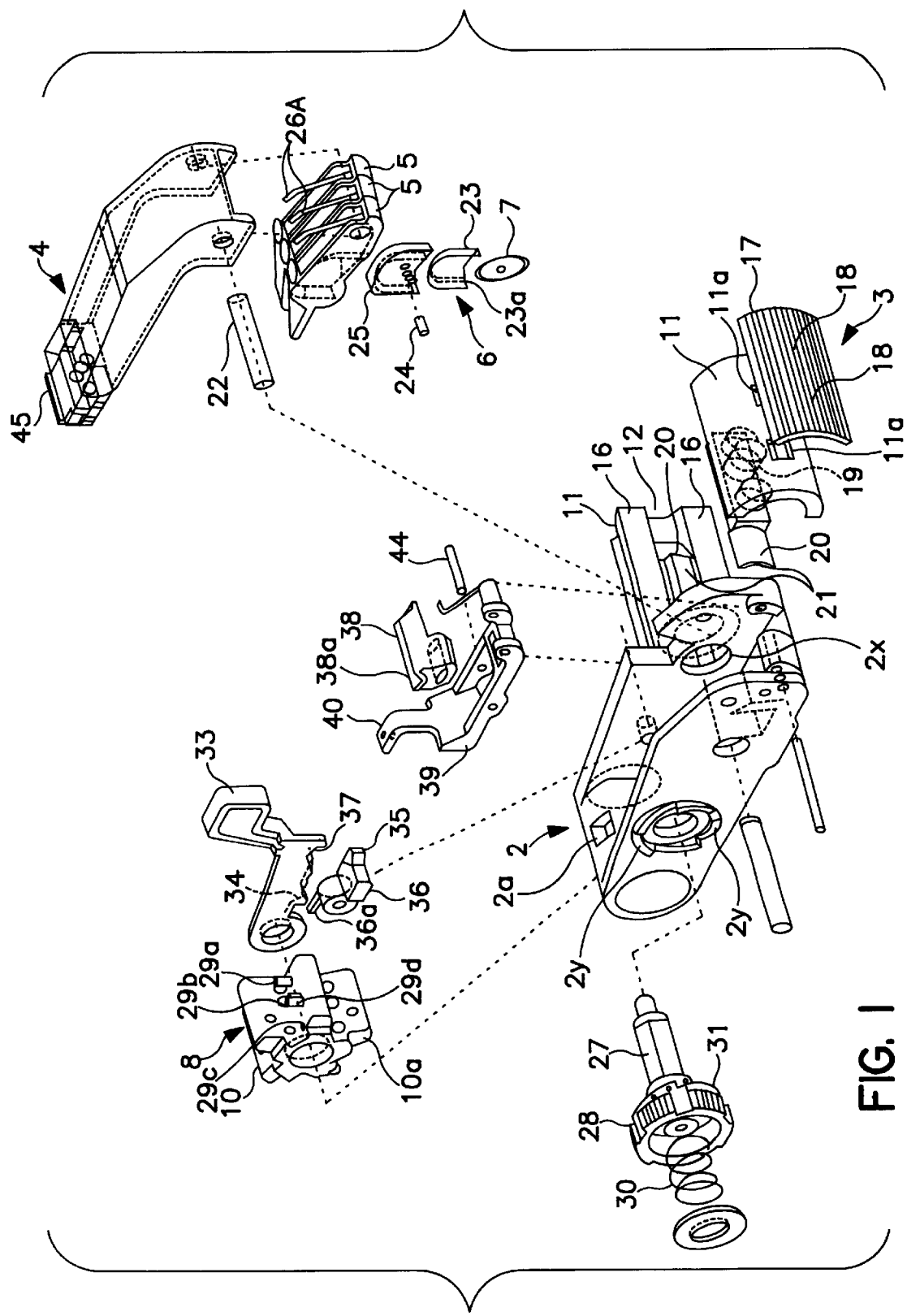
FIG. 1 is an exploded perspective view of one embodiment of the cable stripper according to the present invention.
Figure 2:
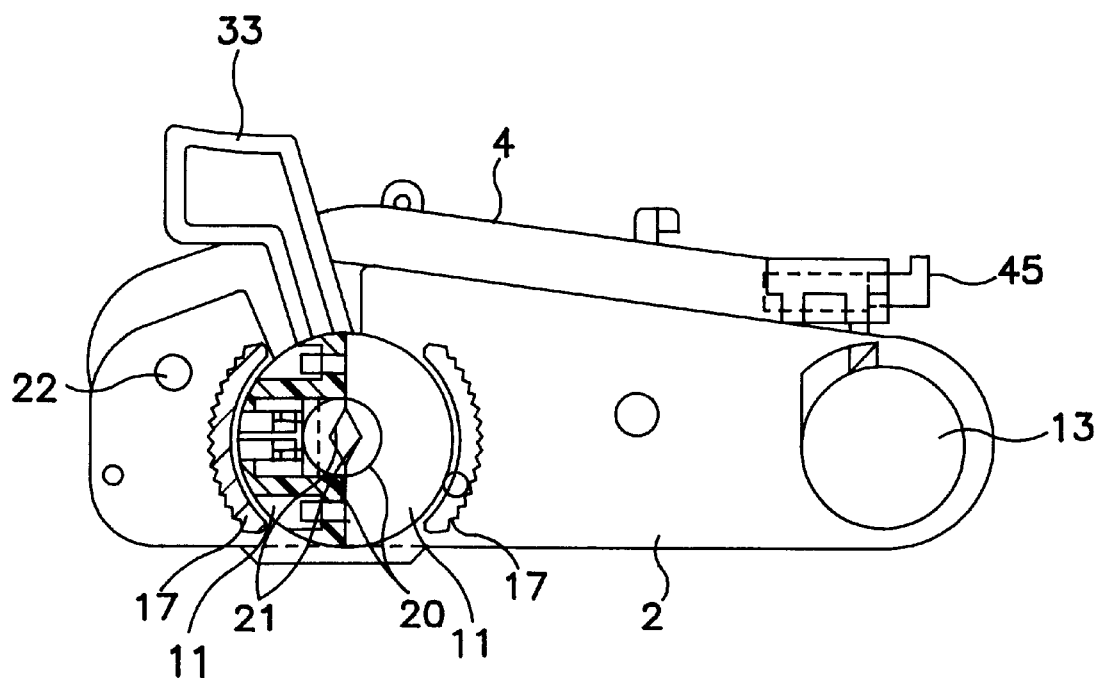
FIG. 2 is a front view of the cable stripper shown in FIG. 1.
Figure 3:
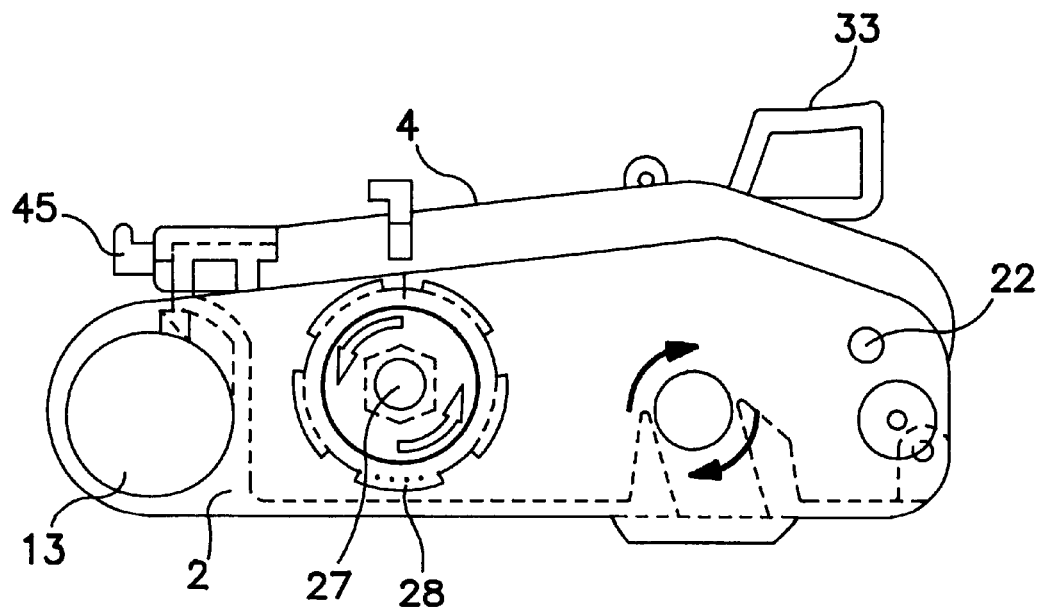
FIG. 3 is a back view of the cable stripper shown in FIG. 1.

As shown in FIGS. 1 through 8, the cable stripper 1 of the present invention substantially comprises a long, slender stripper main body 2, a cable holder 3 rotatably mounted on one side (right side in FIG. 1) of the stripper main body 2, an operating lever 4 pivotally mounted to one end of the stripper main body 2, a plurality of action levers 5 installed inside one end of the main body 2 and including blade assemblies 6, and a limiting device 8 provided inside another end of the main body 2 so as to limit the movement of the action levers 5. In addition, as seen in FIG. 2, an operating hole 13 is opened at another end of the main body 2 so that the operator can put his finger into this operation hole 13 when stripping a cable as described below.

The stripper main body 2, cable holder 3, operating lever 4, action levers 5, and a rotating cam body 10 of the limiting device 8 are preferably formed from a hard plastic material or an appropriate metal material.

The cable holder 3 comprises a pair of guide members 11 which form a guide hole 12 in between so that a cable C such as a coaxial cable (see FIGS. 8 and 9) is inserted into this guide hole 12 and further into a cable cutting chamber which is inside one end of the stripper main body 2.

The cable holder 3 is mounted on one side of the stripper main body 2 in a rotatable fashion. More specifically, the cable holder 3 is comprised of a pair of semi-circular cylindrical guide members 11 so that the cable C is inserted into the space, which is the guide hole 12, formed by the pair of guide member 11 and held thereby.

The stripper main body 2 is provided with a round cable hole 2x. The cable hole 2x is opened so as to be concentric with the guide hole 12 of the cable holder 3, and a circular flange 14 is formed (see FIG. 5) on the outer surface of the main body 2. The circular flange 14 surrounds the edge of the round cable hole 2x so that the cable holder 3 is rotatably mounted on this flange 14 via a groove 15 formed inside of the guide hole 12 of the guide members 11.

More specifically, each of the guide members 11 that form the cable holder 3 is formed with a semicircular groove in the inner surface thereof, and the abutting surfaces 16 (see FIG. 1) of the respective guide members 11 are brought into contact so that the guide members 11 form a single cylindrical body that has a circular groove 15 which engages with the flange 14 of the main body 2. As a result of this engagement, the cable holder 3 is rotatably coupled to the main body 2 with the groove 15 of the cable holder 3 engaged with the flange 14 of the main body 2.

Furthermore, a pair of knurled grip members 17 are mounted on the curved outer surface of each one of the guide members 11. More specifically, dowels 18 are formed on the inner surface of each of the pair of grip members 17, and these dowels 18 are inserted into holes 11a formed in each one of the guide members 11.

In addition, a pair of cable gripping members 20 are provided inside the guide hole 12 of the cable holder 3, and the dowels 18 of the grip members 17 are connected to the cable gripping members 20 through the holes 11a formed in the guide members 11. In addition, the gripping members 20 are provided with V-shaped grooves 21 so as to face each other for positioning and holding the cable C in between. The cable gripping members 20 are pushed inwardly (or toward each other) when the grip members 17 are held by hand, overcoming the spring force of springs 19 (see FIG. 6, only one spring 19 being shown) which are provided between the cable gripping members 20 and the guide members 11. Thus, the guide members 11, the cable gripping members 20 which are connected to the grip members 17 via the dwells 18, and the compression springs 19 form the cable holder 3 in a single unit.

Since the cable holder 3 is constructed as described above, when the cable C is inserted into the guide hole 12 by hand, the cable C, overcoming the force of the springs 19, pushes and separates the abutting cable gripping members 20 so as to push the grip members 17 outwardly in the radial direction of the abutting guide members 11. Accordingly, the cable C is pressed back radially by the pressing springs 19 and held between the cable gripping members 20. In addition, when the operator grips the grip members 17 by hand, the gripping members 20 connected to the grip member 17 can apply further gripping force to the cable C so that the cable C is firmly held via the mutually facing cable gripping members 20 installed inside the guide members 11. The knurls formed on the grip members 17 assist the operator to grip the grip member 17 firmly without any slipping.

Furthermore, the operating lever 4 is pivotally provided on a pivot shaft 22 that is installed inside one end of the stripper main body 2 and near the cable holder 3.

Furthermore, a plurality of elongated action levers 5 (three action levers in the shown embodiment) are provided on the pivot shaft 22 in a pivoting fashion Each of the plurality of action levers 5 extends in the direction of the length of the elongated stripper main body 2, and these action levers 5 are, as seen from FIG. 1, arranged side by side in the direction of the axis of the guide hole 12 of the cable holder 3. The action levers 5 are pushed by the operating lever 4 which covers the action levers 5 so that the levers 5 are simultaneously operated.

Each one of a plurality of (three in the embodiment) blade assemblies 6 is installed in each action lever 5.

Essentially, the blade assembly 6 is a cassette that comprises a casing 25, a circular cutter 7 made of metal and rotatably installed inside the casing 25 via a pin 24, and a thin box-form liner 23. The liner 23 is formed with a V-shaped cut-out 23a in one side (lower edge in FIG. 1) so hat a part of the circular cutter 7 is exposed from the casing 25 through the cut-out 23a. Because of the above structure of the blade assembly 6, if the sharpness of the circular cutter 7 of any blade assembly 6 should drop, the blade assembly 6 that contains such a deteriorated circular cutter 7 is removed from the action lever 5 and replaced entirely by a new glade assembly 6 that contains a new circular cutter 7.

Figure 8:
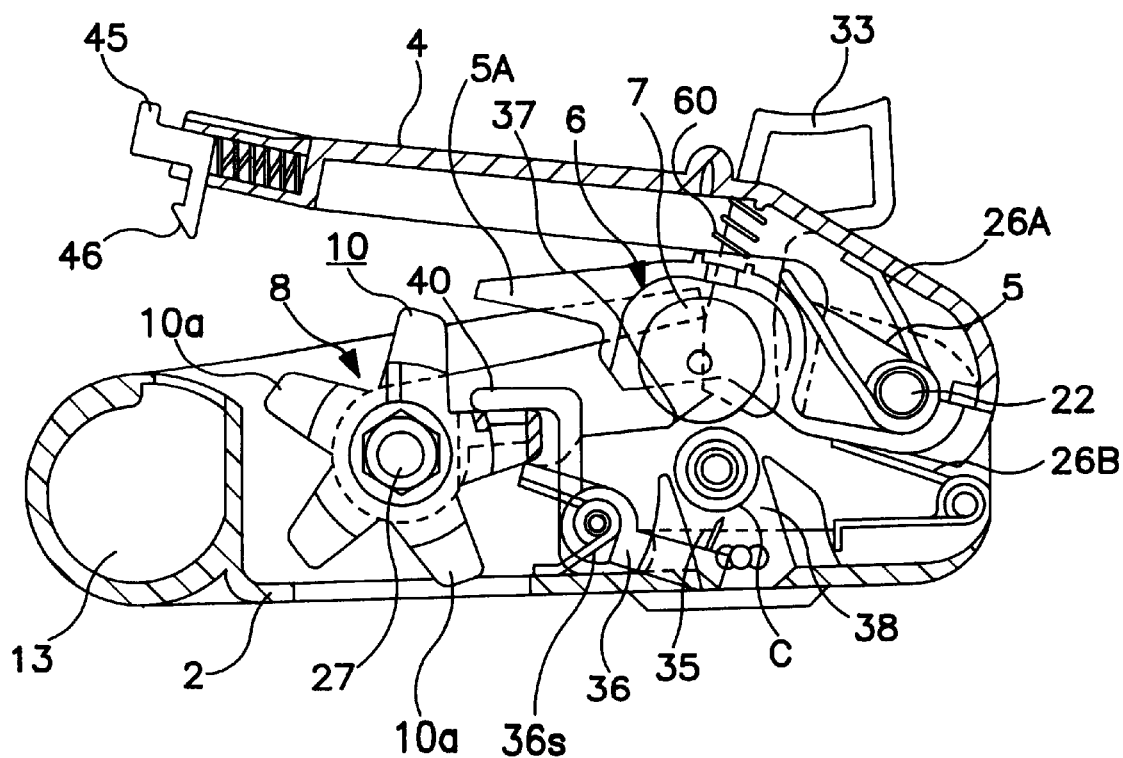
FIG. 8 shows the operating lever in a released position in FIG. 7.

A coil spring 60, as shown in FIG. 8, may be installed between each action lever 5 and operating lever 4 so as to increase the operating pressing force suitable for cutting hard coverings of a cable.

These circular cutters 7 are operated in accordance with the pivoting motion of the corresponding action levers 5 which are positioned in an inside accommodating space of the operating lever 4. The accommodating space is slightly larger than the combined thickness of all three action levers 5 which include the respective cutter 7 so that each cutter 7 can be rotated smoothly without being subjected to any lateral pressure from other cutters.

Springs 26A and 26B which urges each one of the action levers 5 clockwise in FIGS. 1 and 8 is respectively mounted on each action lever 5; and by way of the springs 26A and 26B, the tip end portion 5A of the respective action levers 5 is urged in the direction which causes the tip end portion 5A to stay away from the operating lever 4, i.e., in an opening direction. In other words, a single operating lever 4 covers all three action levers 5 so that the three action levers 5 are simultaneously operated by the single operating lever 4.

The limiting device 8 is for restricting the amount by which the circular cutters 7 cut into the cable C, and it comprises a polygonal rotating cam body 10 and a rotating knob 28.

More specifically, the cam body 10 is mounted on a cam shaft 27 that is rotatably installed inside the stripper main body 2, and the rotating knob 28 which rotates the cam body 10 is installed on the cam shaft 27 and located outside the stripper main body 2. The cam body 10 has a plurality of (five in the embodiment) projecting arms 10a so that the cam body 10 has a star shape as best seen from FIGS. 7 and 8.

Furthermore, one set of adjustment screws 29a, 29b and 29c are installed on each of the projecting arms 10a of the rotating cam body 10. The height of each of the screws exposed outside of the projecting arms 10a (or the depth of each of the screws threaded into the projecting arms) can be adjusted. Each of these adjustment screws 29a, 29b and 29c can be turned so as to be threaded deeper and shallower in the projecting arm 10a of the cam body 10 so that the tip end portions 5A of the action levers 5 are pushed onto the upper ends of these adjustment screws when the operating lever 4 is brought toward the main body 2, thus determining the respective distance of the cutters 7 to be moved towards the cable C to be cut.

The shown rotating cam body 10 has a star shape; however, the shape of the cam body 10 is not limited to a star shape; and it would of course be possible to form the rotating cam body 10 in some other polygonal shape such as triangular, square, hexagonal, octagonal, etc. The selection of the shape of the cam body 10 depends on desired sets of three different depths of the cutting performed by the cutters 7. For instance, if the cam body 10 has a star shape and thus has five projecting arms 10a, then the stripper 1 has five different sets of three combinations of different cable cutting depths (which is determined by the three adjustment screws).

The rotating knob 28 installed on the cam shaft 27 is designed so as to be movable in the axial direction of the cam shaft 27 and rotate the rotating cam body 10 to a desired position so that the rotating cam body 10 is set in place at such a desired position. Furthermore, a spring 30 is installed inside the rotating knob 28 so that the rotating knob 28 can be elastically pushed in the axial direction. In addition, the rotating knob 28 is provided with an engaging mechanism 31 such as a ratchet mechanism, or other appropriate means such as projections, etc. The engaging mechanism 31 allows the rotating knob 28 to rotate only in one direction (for instance in the direction of arrows in FIG. 3) and prevents the rotating knob 28 from rotating in the opposite direction so that the rotating knob 28 and the rotating cam body 10 are set at a desired position. Accordingly, the rotating knob 28 can be held firmly at a desired position by way of an engagement of the engaging mechanism 31 with engaging pawls 2y formed on the outer surface of the main body 2 or by way of insertion of projections (not shown) formed on the rotating knob 28 into small holes (not shown) formed in the side wall of the stripper main body 2.

The stripper main body 2 is further provided with a lower cutter lever 33 which is pivotally provided on the cam shaft 27 of the limiting device 8. The lower cutter lever 33 has a pressing part 34 which protrudes downward and contacts an arm 36a (see FIG. 8) of a lower blade assembly 36 that includes a lower blade 35. When the lower cutter lever 33 is depressed by hand overcoming the spring force of the spring 36s, the pressing part 34 of the lower cutter lever 33 pushes down the arm 36a so as to raise the lower blade 35 that is provided at the opposite end of the lower blade assembly 36; as a result, the lower blade 35 is caused to cut into the cable C. Thus, with this operation, it is possible to form a straight cut in the cable C in the axial direction thereof when the cable C is pulled out of the stripper 1.

Furthermore, the lower cutter lever 33 has an inverted V-shaped cable presser 37. The cable presser 37 presses and holds the cable C in cooperation with a V-shaped groove 38a of a cable receiver 38 which is installed near the cable hole 2x inside the main body 2, so that the axis of the cable C and the center of cutting by the cutters 7 coincide by means of cable presser 37 and the cable receiver 38. The cable receiver 38 is disposed so that its V-shaped surface 38a is flush to the inner (lower) surface of the guide hole 12 of the cable holder 3.

Figure 7:
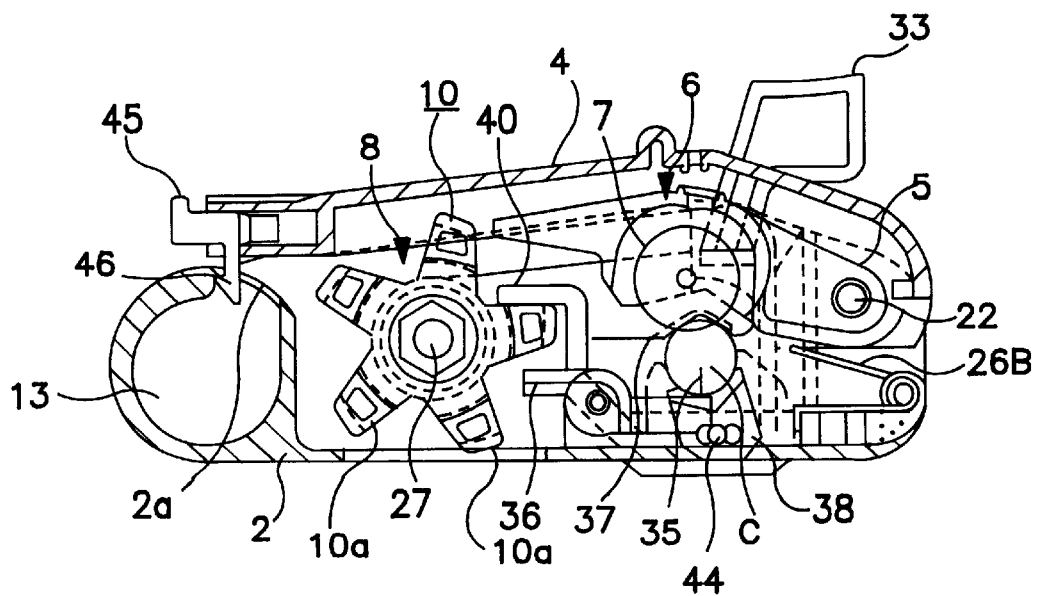
FIG. 7 is a sectional view taken along the line 7—7 in FIG. 6.

As best seen from FIGS. 1 and 7, the cable receiver 38 is supported by a pin 44 so as to be slidable within a holding member 39 which is installed inside the main body 2. An arm 40 of the holding member 39 contacts an adjustment screw 29d provided in the rotating cam body 10 so that the amount of sliding movement of the cable receiver 38 can be adjusted.

Accordingly, the height at which the arm 40 of the holding member 39 engages with the adjustment screw 29d can be adjusted by changing the exposing height of the adjustment screw 29d; and the position of the cable receiver 38 can be adjusted according to the diameter of the cable C.

Furthermore, a relief (not shown) is formed in the cable receiver 38 so that the upward movement of the lower blade 35 is not hindered.

Figure 9A:
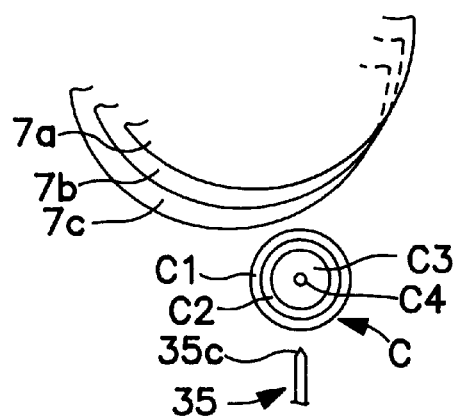
FIGS. 9(a), 9(b) and 9(c) illustrate different positions of the blades of the cable stripper.

Here, the cable C is a coaxial cable; and as shown in FIG. 9(a), it consists of, for instance, an outer covering C1, an outer conductor C2, an inner covering C3 and a core conductor C4 in this order from the outside toward the center.

The operation of the cable stripper will be described below.

When the cable stripper 1 is not in use, as seen from FIG. 7, a hook 46 of the lid button 45 mounted at the tip end of the operating lever 4 is kept engaged with a hooking hole 2a opened in the stripper main body 2, and the operating lever 4 is fitted to the stripper main body 2.

Upon use, the lid button 45 is pressed down (in FIG. 7); as a result, the hook 46 of a lid button 45 is disengaged from the hooking hole 2a of the stripper main body 2; thus, the operating lever 4 is released from the stripper main body 2 and popped up slightly by the springs 26, and the action levers 5 are caused to pivot clockwise in FIG. 7. Accordingly, as shown in FIG. 8, the circular blades 7 are raised so as to withdraw from an imaginary cylinder extending from the guide hole 12 of the cable holder 3.

Figure 4:
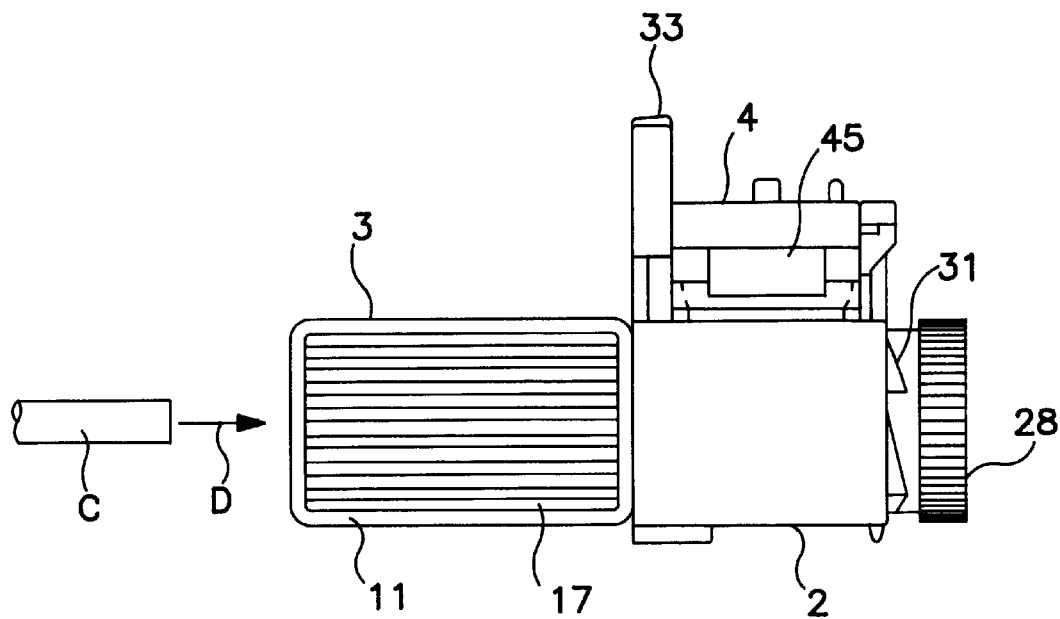
FIG. 4 is a right-side view of the cable stripper shown in FIG. 1.
Figure 5:
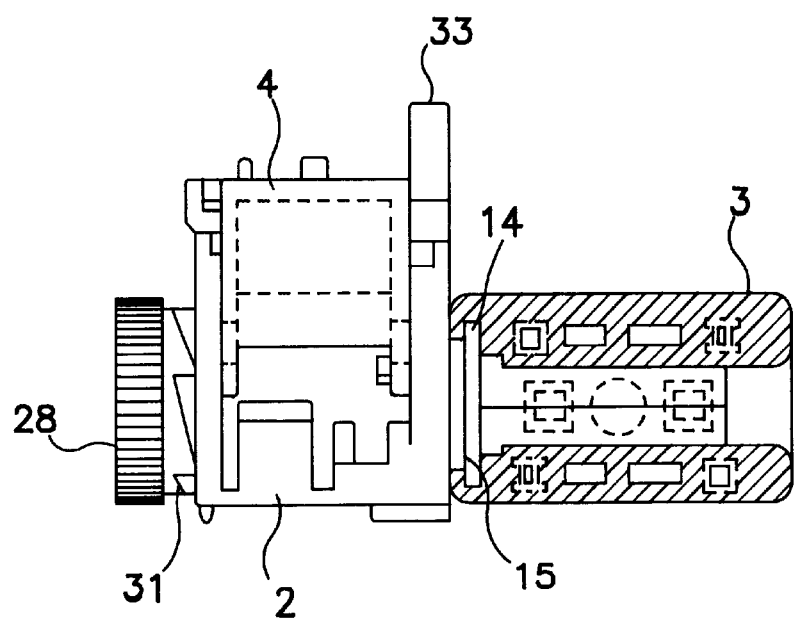
FIG. 5 is a left-side partial sectional view of the cable holder of the cable stripper shown in FIG. 1.
Figure 6:
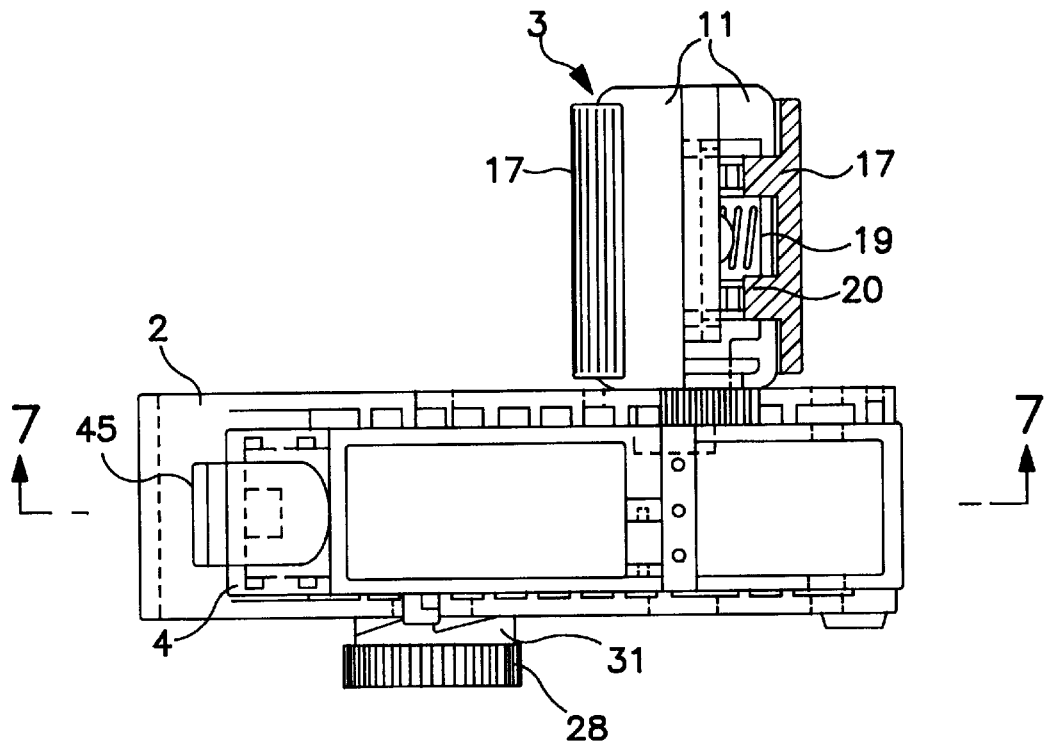
FIG. 6 is a top view of the cable stripper shown in FIG. 1.

Next, the cable C is inserted into the interior of the guide hole 12 of the cable holder 3 and further into the stripper main body 2 from the direction of arrow D in FIG. 4. The cable C is inserted until the tip end of the cable C comes into contact with the end surface of the cable receiver 38 which is installed inside the hollow space formed in the stripper main body 2 so as to positionally correspond to the guide hole 12. This contact of the tip end of the cable C (and therefore the amount the cable C inserted into the stripper main body 2) is confirmed visually through the space formed between the raised operating lever 4 and the stripper main body 2.

Then, the operating lever 4 is pressed towards the main body 2 so that the hook 46 of the lid button 45 at the end of the operating lever 4 engages with the hooking hole 2a of the stripper main body 2 (see FIG. 7). As a result, the operating lever 4 is fastened to the stripper main body 2 and cable C is held between the operating lever 4 and the main body 2. Then, the operator firmly grips the cable holder 3 with one hand so that the cable C is securely held in place between the cable gripping members 20.

When these preparations have been completed, the operator inserts his finger, for instance his index finger, into the operating hole 13 of the stripper main body 2 and rotates the stripper main body 2 a few times in the circumferential direction about the cable holder 3 with the inserted finger.

As a result, the blades 7 revolve about the cable C while rotating about the pins 24 and gradually bite into the cable C, thus forming cuts around the entire circumference of the cable C.

Figure 9B:
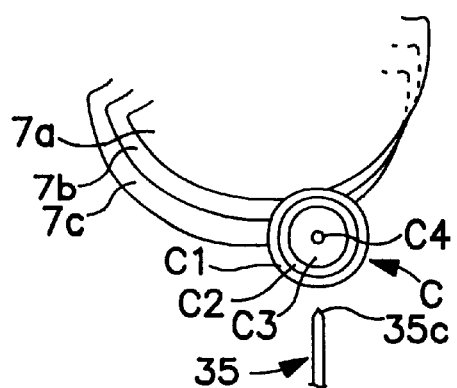

The amount the blades 7 bite into the cable C is set beforehand by adjusting the exposing length of the respective adjustment screws 29a (for the outermost covering C1), 29b (for the outer conductor C2) and 29c (for the innermost covering C3). Accordingly, as shown in FIG. 9(b), the respective portions of the cable C can be cut by the first blade 7a biting into the outermost covering C1, by the second blade 7b biting into the outer conductor C2, and by the third blade 7c biting into the innermost covering C3.

Afterward, the lid button 45 of the operating lever 4 is pressed so that the hook 46 is disengaged from the hooking hole 2a of the stripper main body 2 so that, as shown in FIG. 8, the operating lever 4 and the three action levers 5 are pivoted clockwise until the pivot limitation; and in addition, the lower cutter lever 33 is pressed down (in FIG. 8).

Figure 9C:
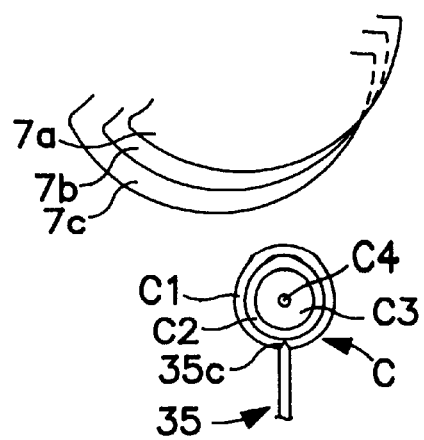

As a result, as shown in FIG. 9(c), the respective blades 7a, 7b and 7c are withdrawn and separated from the cable C;

and, on the other hand, the cutting edge 35c of the lower blade 35 is raised and bites into the outermost covering C1 of the cable C. The amount by which the cutting edge 35c bites into the cable C is set beforehand by adjusting the position of the adjustment screw 29d of the rotating cam body 10.

Afterward, the cable C is pulled in the direction opposite from arrow D (see FIG. 4) so as to come out of the stripper main body 2 and cable holder 3 with the lower cutter lever 33 pressed; as a result, the cutting edge 35c of the lower blade 35 forms a straight cut in the outermost covering C1 in the axial direction of cable C.

Accordingly, three circumferential cuts of different depths and one straight cut oriented in the axial direction are formed in the end portion of the cable C; and the outer covering C1 can easily be stripped from the cable C along the straight cut, and the end portion of the cable C is stripped in a form of three steps along the three circumferential cuts as boundaries.

In the embodiment above, the lower blade 35 is a circular blade; however, it is also possible to use a lower blade 35 that has a cutting edge 35c extending straight for a prescribed distance in the direction of the length of the cable C. In this case, an axially straight cut having the length of the cutting edge 35c can be formed in the outermost covering C1 of the cable C when the cutting edge 35c is raised and bites into the cable C while the blades 7a, 7b and 7c are biting into the cable C. Furthermore, a pointed bar like a nail can be used instead of circular or straight lower blade.

As seen from the above, the cable stripper of the present invention comprises a plurality of blades, which are used to form cuts oriented in the same direction in the coverings of the cable, and a lower blade, which is used to form an axial straight cut in the covering; and these blades are all disposed inside the stripper main body and operated by a single operating lever. Accordingly, by operating the operating lever while the cable is brought inside the stripper main body, it is possible to set the cutting center to coincide with the axial line of the cable and form a plurality of stepped-form circumferential cuts and a single axial straight cut in the cable by way of a single extremely easy operation. Furthermore, the cable stripper of the present invention can be used for making a stepped-form cutting of different types of cables with different diameters so that cables are connected to, for instance, connectors.

What is claimed is:

1. A cable stripper comprising:
    a stripper main body;
    an operating lever pivotally mounted to one end of the stripper main body about a first axis;
    a cable holder rotatable installed on said stripper main body so as to be rotatable about a second axis which extends generally parallel to said first axis and through said stripper main body, said cable holder for holding an end portion of a cable;
    a plurality of action levers pivotally supported inside said stripper main body so as to be coaxially supported with said operating lever for pivoting in a path about said first axis;
    a blade assembly detachably provided in each of said plurality of action levers, each said blade assembly including a circular cutter; and
    a limiting device rotatably installed inside said stripper main body adjacent said plurality of action levers, at least a portion of said limiting device being disposed in the path of said plurality of action levers for limiting an amount of movement of said plurality of action levers so as to determine a cutting depth of the cable by said circular cutter;
    wherein each said blade assembly is mounted on a respective one of said plurality of action levers so that its circular cutter is arranged in a direction perpendicular to said second axis, and
    wherein said limiting device comprises:
        a rotating cam body attached to a cam shaft that is rotatably installed in said stripper main body, and
        an operating knob installed on one end of said cam shaft, said operating knob having an engaging mechanism for engaging with and disengaging from said stripper main body.

2. A cable stripper according to claim 1, wherein said rotating cam body is formed in a polygonal shape which has a plurality of projecting arms, and adjustment screws which limit said movement of said action levers are installed on each of said projecting arms.

3. A cable stripper comprising:
    an elongated stripper main body having a cable hole formed in a side wall of one end of said stripper main body for receiving a cable;
    a substantially cylindrical cable holder rotatably provided on an outer surface of said side wall of said stripper main body so as to be circumferentially rotatable, said cable holder having an axial guide hole which is concentric with said cable hole of said stripper main body for guiding a said cable into a cable receiving area in said guide hole and further into said stripper main body;
    an elongated operating lever pivotally mounted to said one end of said stripper main body;
    a plurality of action levers pivotally provided inside said one end of said stripper main body, each of said plurality of action levers being pivotable along a path by said operating lever, and each of said plurality of action levers being provided with a blade assembly having a circular cutter rotatably and removably installed therein; and
    a limiting device rotatably provided on a cam shaft installed inside another end of said stripper main body, said limiting device being provided with a plurality of projecting portions, wherein a plurality of adjustment screws are installed so that on each of said projecting portions, and one of said projecting portions is positioned in the path of said action levers, a part of each of said plurality of actions levers comes into contact with each of said plurality of adjustment screws.

4. A cable stripper according to claim 3, further comprising a lower lever with one end thereof pivotally coupled to said cam shaft, said lower lever being linked to a lower blade installed in said one end of said stripper main body such that, when said lower lever is pressed, said lower blade moves into said cable receiving area for contacting with said cable guided into said stripper main body.

* * * * *